United States Patent
Higashi (10) Patent No.: US 8,090,991 B2
(45) Date of Patent: Jan. 3, 2012

(54) INFORMATION PROCESSING APPARATUS, METHOD, AND COMPUTER PROGRAM PRODUCT FOR SELF-DIAGNOSIS FOR UTILIZING MULTIPLE DIAGNOSTIC DEVICES, EACH HAVING EXCLUSIVE ACCESS TO A RESOURCE

(75) Inventor: Hidenori Higashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 402 days.

(21) Appl. No.: 12/222,303

(22) Filed: Aug. 6, 2008

(65) Prior Publication Data

US 2009/0006893 A1  Jan. 1, 2009

Related U.S. Application Data

(63) Continuation of application No. PCT/JP2006/302005, filed on Feb. 6, 2006.

(51) Int. Cl.
G06F 11/00 (2006.01)

(52) U.S. Cl. ............ 714/40; 714/27; 714/42; 714/48

(58) Field of Classification Search .......... 714/13, 714/49, 53, 54, 27, 40, 42, 43, 44, 48; 702/121
See application file for complete search history.

(56) References Cited

U.S. PATENT DOCUMENTS

| | | | | |
|---|---|---|---|---|
| 4,587,609 A | * | 5/1986 | Boudreau et al. | 710/200 |
| 5,448,716 A | * | 9/1995 | Hardell et al. | 713/375 |
| 5,790,850 A | * | 8/1998 | Natu | 713/2 |
| 5,793,945 A | | 8/1998 | Tabata et al. | |
| 6,158,000 A | * | 12/2000 | Collins | 713/1 |
| 6,574,748 B1 | * | 6/2003 | Andress et al. | 714/11 |
| 6,625,698 B2 | * | 9/2003 | Vartti | 711/141 |
| 6,681,345 B1 | | 1/2004 | Storino et al. | |
| 6,748,556 B1 | | 6/2004 | Storino et al. | |
| 6,854,081 B1 | | 2/2005 | Suzuki | |
| 7,007,192 B2 | * | 2/2006 | Yamazaki | 714/5 |
| 7,073,102 B2 | * | 7/2006 | Nicolaidis | 714/718 |
| 2005/0102565 A1 | | 5/2005 | Barr et al. | |

FOREIGN PATENT DOCUMENTS

| | | |
|---|---|---|
| JP | 02-311950 | 12/1990 |
| JP | 08-263463 | 10/1996 |
| JP | 9-146851 | 6/1997 |
| JP | 2000-40069 | 2/2000 |
| JP | 2002-123402 | 2/2002 |
| JP | 2002-108630 | 4/2002 |
| JP | 2005-129053 | 5/2005 |

OTHER PUBLICATIONS

Notice of Rejection mailed May 25, 2010, corresponds to Japanese Patent Application No. 2007-557689.
International Search Report dated Apr. 28, 2006 for International Application PCT/JP2006/302005.

* cited by examiner

*Primary Examiner* — Joseph Schell
(74) *Attorney, Agent, or Firm* — Staas & Halsey LLP

(57) ABSTRACT

A logical central processing unit (logical CPU) selects a target device. When the target device is shared by another logical CPU, the logical CPU determines whether the logical CPU is in charge of exclusively making diagnosis of the target device. When the target device is not shared by another logical central processing unit or when the logical CPU is exclusively in charge of making diagnosis of the target device, the logical CPU makes diagnosis of the target device and stores a result of diagnosis in a storage unit.

9 Claims, 12 Drawing Sheets

| CPU ID | RESULT OF DIAGNOSIS | CPU-CORE ID | RESULT OF DIAGNOSIS | LOGICAL-CPU ID | RESULT OF DIAGNOSIS |
|---|---|---|---|---|---|
| #1 | 0 | #1-1 | 0 | #1-1-1 | 1 |
| | | | | #1-1-2 | 1 |
| | | | | ... | ... |
| | | | | #1-1-n | 1 |
| | | #1-2 | 0 | ... | ... |
| | | ... | ... | ... | ... |
| | | #1-m | 0 | ... | ... |
| #2 | | ... | ... | ... | ... |
| ... | | ... | ... | ... | ... |
| #k | | ... | ... | ... | ... |

INFORMATION PROCESSING APPARATUS, METHOD, AND COMPUTER PROGRAM PRODUCT FOR SELF-DIAGNOSIS FOR UTILIZING MULTIPLE DIAGNOSTIC DEVICES, EACH HAVING EXCLUSIVE ACCESS TO A RESOURCE

CROSS REFERENCE TO RELATED APPLICATIONS

This is a continuing application, filed under 35 U.S.C. §111(a), of International Application PCT/JP2006/302005, filed Feb. 6, 2006, the contents of which are incorporated herein by reference.

BACKGROUND OF THE INVENTION

1. Field of the Invention

The present invention relates to a technology for diagnosing a central processing unit (CPU) in an information processing apparatus.

2. Description of the Related Art

There has been known an information processing apparatus that makes self-diagnosis of its electric or electronic units at the time of the start-up. Upon detecting a malfunctioning unit, the information processing apparatus either starts up after disconnecting the malfunctioning unit or stops the start-up process. Thus, a situation that an information processing apparatus with a malfunctioning unit is activated is prevented from occurring, which increases reliability of the information processing apparatus.

The typical self-diagnosis process is required to be performed exclusively for common resources; and therefore, it is necessary to perform an exclusive process before making diagnosis of a common resource that is shared by a plurality of devices is made. For example, if a main memory is shared by a plurality of central processing units (CPUs) in a multi-processor system, it is necessary to make diagnosis of the main memory exclusively by a single CPU or a plurality of cooperative CPUs.

A method that is generally used to diagnose a main memory includes writing a plurality of test patterns in the main memory, reading the test pattern from the main memory, and checking whether the read test pattern is the same as the written test pattern. In this method, however, if a plurality of CPUs simultaneously makes diagnosis of the same main memory, one of the CPUs may overwrite a test pattern on a test pattern that has been previously written by another CPU. As a result, a wrong result of diagnosis is obtained. To prevent this, the diagnosis should be performed exclusively by a single CPU or a plurality of cooperative CPUs.

Japanese Patent Application Laid-open No. H2-311950 discloses a conventional technology of making, by a single CPU, diagnosis of a storage device that is shared by a plurality of CPUs within a short time. In this technology, another CPU is caused to perform a diagnosis if a malfunction occurs in the CPU that is originally in-charge of the diagnosis.

Multi-core CPUs, i.e., CPUs including a plurality of CPU cores on a single die have been widely used with the development of process technologies. Some advanced multi-core CPUs include CPU cores that are not just placed on a single die but they share a cache. Such advanced multi-core CPUs can perform high-speed interaction between the CPUs, thereby achieving higher performance.

Moreover, there have been developed still advanced multi-core CPUs in which a plurality of CPUs is virtually produced from a single CPU by applying a multi-thread technology to the CPU cores. The still advanced CPUs exhibit excellent performance in executing a plurality of programs in parallel.

To operate an information processing apparatus including such advanced multi-core CPUs in a stable manner, it is necessary to make diagnosis of the CPU cores and a common resource including a cache that is shared by the CPU cores during the start-up. It is necessary to make such a diagnosis exclusively. However, the conventional self-diagnosis technology disclosed in Japanese Patent Application Laid-open No. H2-311950 can not perform a proper exclusive process, because it does not take into consideration the possibility of existence of a common resource inside the CPUs. As a result, diagnosis of the common resource can not be made correctly.

SUMMARY

It is an object of the present invention to at least partially solve the problems in the conventional technology.

According to an aspect of the present invention, there is provided an information processing apparatus. The information processing apparatus includes a first storage unit that stores therein a diagnosis program that is used to make diagnosis whether units forming the information processing apparatus are normal; a central processing unit that includes a plurality of command control units each of which executes the diagnosis program independently; and a common resource that is shared by the command control units, wherein the central processing unit causes only one of the command control units to execute the diagnosis program to make diagnosis of the common resource at a given time point; and a second storage unit that stores therein a result of diagnosis that is obtained by the command control units.

According to another aspect of the present invention, there is provided a computer program product. The computer program product includes a diagnosis program that causes an information processing apparatus to make diagnosis whether units forming the information processing apparatus are normal, wherein the information processing apparatus includes a plurality of central processing unit cores functioning as logical central processing units each of which executes the diagnosis program independently. The diagnosis program causes a specific logical central processing unit from among the logical central processing units to execute selecting a target device from among the units forming the information processing apparatus based on a predetermined order; determining, when the target device is a device that is shared by another logical central processing unit, whether the specific logical central processing unit is exclusively in charge of making diagnosis of the target device; making diagnosis of the target device when the target device is a device that is not shared by any other logical central processing unit or when it is determined at the determining that the specific logical central processing unit is exclusively in charge of making diagnosis of the target device; and storing a result of diagnosis made at the making in a storage unit.

According to still another aspect of the present invention, there is provided a diagnosis method used in an information processing apparatus to make diagnosis whether units forming the information processing apparatus are normal, wherein the information processing apparatus includes a plurality of central processing unit cores functioning as logical central processing units each of which executes the diagnosis program independently. The diagnosis method includes first selecting including selecting a target device from among the devices forming the information processing apparatus based on a predetermined order; second selecting including selecting, when the target device is a device that is shared by a plurality of logical central processing units, a first logical central processing unit from among the logical central processing units; and first causing including causing the first logical central processing unit to make diagnosis of the target device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
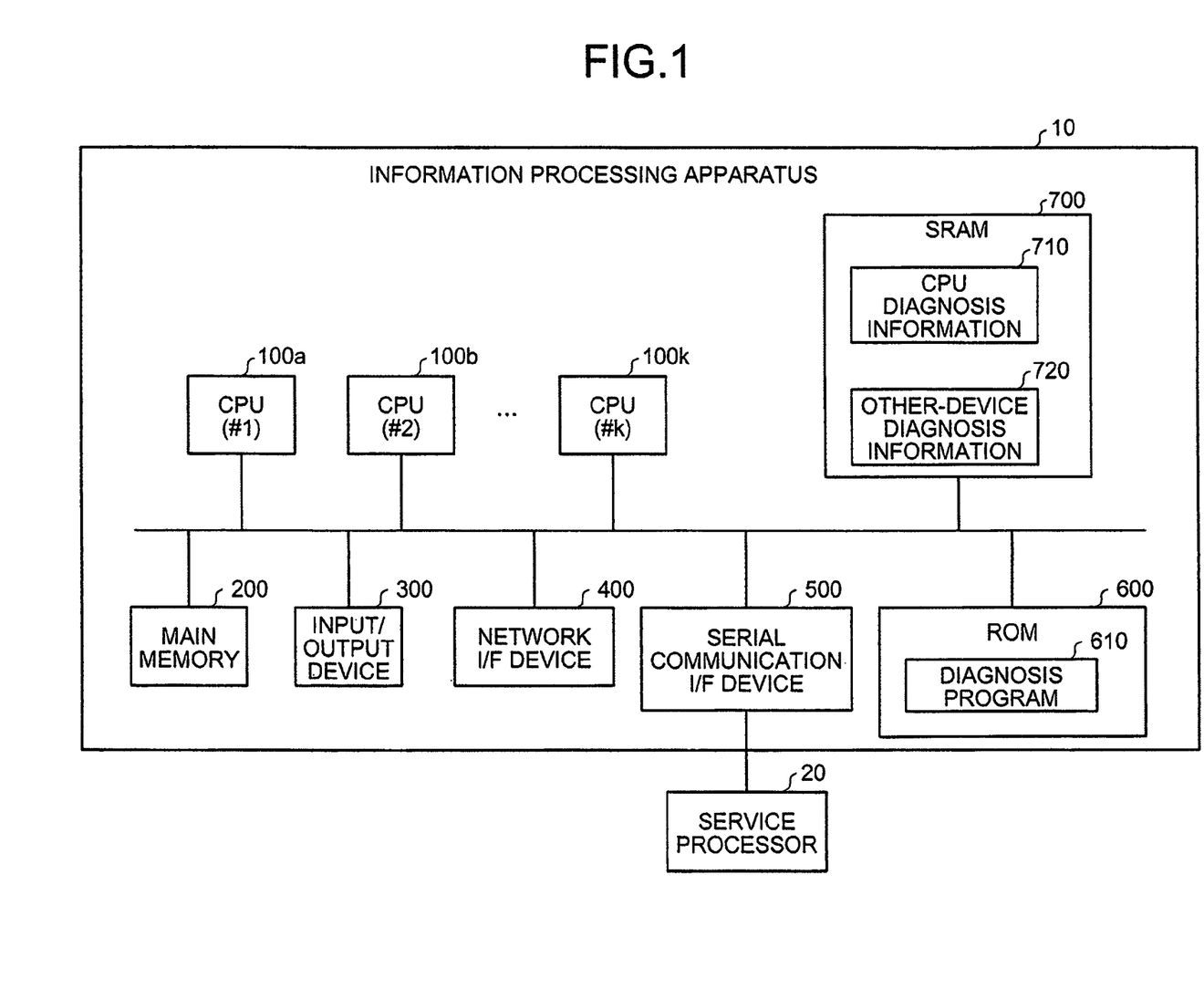
FIG. 1 is a block diagram of an information processing apparatus according to an embodiment of the present invention.

Given below is an explanation about the structure of an information processing apparatus 10 according to an embodiment of the present invention. FIG. 1 is a block diagram of the information processing apparatus 10. The information processing apparatus 10 includes k number of CPUs 100a to 100k, a main memory 200, an input/output device 300, a network interface (I/F) device 400, a serial communication interface (I/F) device 500, a read only memory (ROM) 600, and a static random access memory (SRAM) 700. Those devices are connected to each other via, for example, a bus. Although a plurality of CPUs is shown in FIG. 1, it is sufficient that the information processing apparatus 10 includes one CPU.

The CPUs 100a to 100k are multi-core CPUs including a plurality of CPU cores supporting multithreading. The CPUs 100a to 100k are identified by identification numbers from #1 to #k. The CPUs 100a to 100k have the same structure. The CPU 100a, representing the CPUs, is described below in detail.

Figure 2:
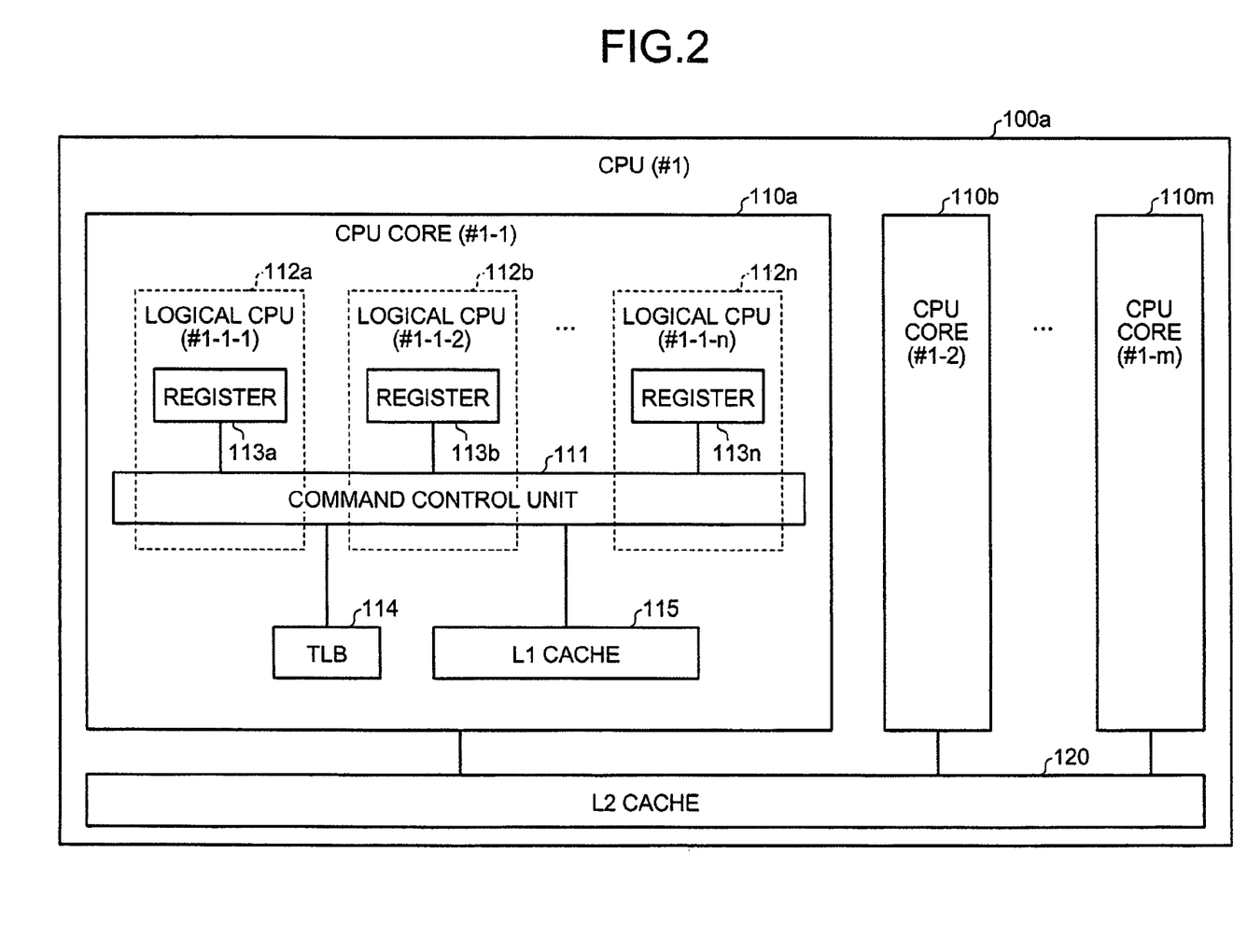
FIG. 2 is a block diagram of a CPU shown in FIG. 1.

FIG. 2 is a detailed block diagram of the CPU 100a. The CPU 100a includes m number of CPU cores 110a to 110m, an L2 cache 120. Each of the CPU cores 110a to 110m functions as an independent CPU. The CPU cores 110a to 110m are identified by identification numbers from #1-1 to #1-m. A first number followed by "-" indicates the CPU in which the CPU core is included; and a second number following "-" indicates a serial number allocated to the CPU core in the CPU. The CPU core 110a, representing the CPU cores, is described below in detail.

The CPU core 110a includes a command control unit 111, n number of registers 113a to 113n, a translation lookaside buffer (TLB) 114, and an L1 cache 115. The command control unit 111 is a processing unit that performs various computing, input/output control, or the like. The command control unit 111 supports multithreading, so that the CPU core 110a can virtually act as n number of CPUs viewed from an operating system or an application program that operates on the information processing apparatus 10. The virtual CPU is called "logical CPU".

Each of the logic CPUs in the CPU core 110a is an actor that executes computer programs. The CPU 100a includes m number of CPU cores; and each of the CPU cores acts as n number of logical CPUs. In other words, the CPU 100a can virtually execute m×n number of commands in parallel. The logical CPUs are identified by identification numbers from #1-1-1 to #1-1-n. Numbers followed by right-ended "-" indicate the identification number of the CPU core in which the logical CPU is included; and the remaining number indicates a serial number allocated to the logical CPU in the CPU core.

The registers 113a to 113n are storage devices in which the command control unit 111 stores data or counted values that are used for computing. There is one register corresponding to each one of the logical CPUs 112a to 112n.

The TLB 114 stores therein a transformation table for transforming between a virtual memory-space and a real memory-space. The L1 cache 115 is a primary cache that is used to speed up transaction between the main memory 200 and the logical CPUs 112a to 112n. The TLB 114 and the L1 cache 115 are shared by all the logical CPUs 112a to 112n.

The structure of the CPU cores 110b to 110m is the same as the structure of the CPU core 110a. The L2 cache 120 is a secondary cache for aiding the L1 caches 115 that are inside the CPU cores 110a to 110m. The L2 cache 120 is shared by all the CPU cores 110a to 110m.

In this manner, the CPU 100a includes the CPU cores 110a to 110m, the CPU cores 110a to 110m share the L2 cache 120, and the logical CPUs 112a to 112n of each of the CPU cores 110a to 110m share the TLB 114 and the L1 cache 115.

Given below is an explanation about the self-diagnosis process performed by the CPU 100a during the start-up of the information processing apparatus 10. The TLB 114 and the L1 cache 115 are shared by the logical CPUs 112a to 112n as described above. To prevent making wrong diagnosis due to interference between diagnosis processing units, it is required to control the CPU 100a in such a manner that only one from among the logical CPUs of each of the CPU cores is in-charge of diagnosis of the TLB 114 and the L1 cache 115.

Moreover, the L2 cache 120 is shared by the CPU cores 110a to 100m as described above. To prevent making wrong diagnosis due to interference between diagnosis processing units, it is required to control the CPU 100a in such a manner that only one from among the logical CPUs of any one of the CPU cores is in-charge of diagnosis of the L2 cache 120.

The structure of the CPUs 100a to 100k shown in FIG. 2 is exemplary, i.e., CPUs having a cache structure different from that shown in FIG. 2 can be used as the CPUs 100a to 100k. For example, it is allowable to use CPUs including CPU cores each of which includes the secondary cache or CPUs including a shared device other than the TLB and the cache.

Referring back to FIG. 1, the main memory 200 is used to load data or computer programs when the CPUs 100a to 100k execute various information processing. The input/output device 300 is an input/output device such as a hard disk device. The network I/F device 400 is used to receive or send data via a network.

The serial communication I/F device 500 connects the information processing apparatus 10 with an external device by using a serial communication connecting means such as recommended standard 232C (RS-232C). The information processing apparatus 10 is connected to a service processor 20 via the serial communication I/F device 500. The service processor 20 performs various processing for managing operations of the information processing apparatus 10. Some other connecting means can be used instead of the serial communication connecting means.

The ROM 600 stores therein a diagnosis program 610. The diagnosis program 610 is used for performing the self-diagnosis process by each of the logical CPUs during the start-up of the information processing apparatus 10.

The SRAM 700 is a rewritable nonvolatile memory, and stores therein results of diagnosis that are obtained by executing the diagnosis program 610 as CPU diagnosis information 710 and other-device diagnosis information 720. The CPU diagnosis information 710 is data about diagnosis of the CPUs 100a to 100k, and the CPU cores and the logical CPUs of the CPUs 100a to 100k. The other-device diagnosis information 720 is data about diagnosis of devices other than the CPUs and relevant units.

The structure of the information processing apparatus 10 shown in FIG. 1 is exemplary, i.e., the information processing apparatus 10 can have a structure that is different from that shown in FIG. 1. For example, a device that is not shown in FIG. 1 can be connected to the information processing apparatus 10. Moreover, the diagnosis program 610, the CPU diagnosis information 710, and the other-device diagnosis information 720 can be stored in a newly provided storage unit. Moreover, the diagnosis program 610, the CPU diagnosis information 710, and the other-device diagnosis information 720 can be stored at locations different from those shown in FIG. 1.

The diagnosis program 610 is read by each of the logical CPUs during the start-up of the information processing apparatus 10. The logical CPU executes the read diagnosis program 610 to perform the self-diagnosis process. Given below is an explanation about a case where the logical CPU 112a executes the diagnosis program 610.

Figure 3:
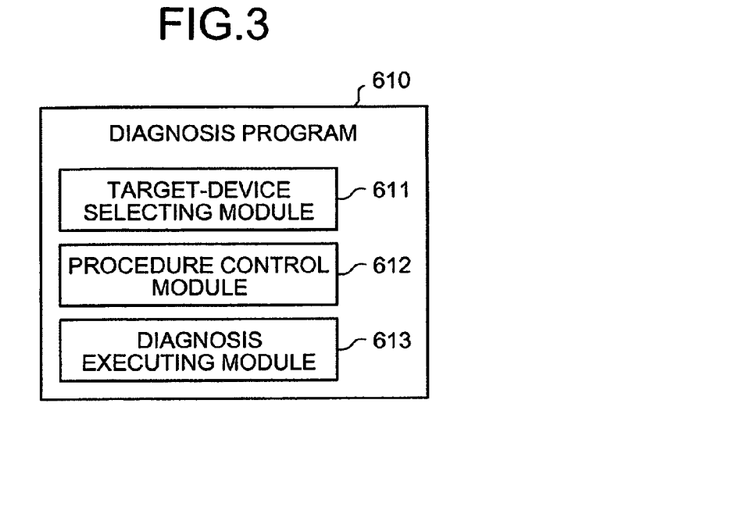
FIG. 3 is a block diagram for explaining a diagnosis program.

FIG. 3 is a block diagram for explaining the diagnosis program 610. The diagnosis program 610 includes a target-device selecting module 611, a procedure control module 612, and a diagnosis executing module 613.

The target-device selecting module 611 causes the logical CPU to select devices sequentially in a predetermined order as a target device of which diagnosis is made. More particularly, the register 113a is selected first as the target device, followed by the TLB 114, the main memory 200, the L1 cache 115, the L2 cache 120, and devices outside the CPU 100a.

The target-device selecting module 611 causes the logical CPU 112a to select the target device in the order from a device closer to the logical CPU 112a in principal. However, the main memory 200 is selected prior to the L1 cache 115 and the L2 cache 120, although the L1 cache 115 and the L2 cache 120 are closer to the logical CPU 112a as compared with the main memory 200. This is because the logical CPU 112a accesses the L1 cache 115 and the L2 cache 120 not directly but via the maim memory 200. Therefore, it is necessary to perform diagnosis of the main memory 200 before diagnosis of the L1 cache 115 and the L2 cache 120.

The procedure control module 612 is used to control procedure of diagnosis. If the target device, e.g., the register 113a, is occupied by the logical CPU 112a, the procedure control module 612 causes the logical CPU 112a to make diagnosis of the target device, regardless of what processing are being performed by the other logical CPUs.

If the target device, e.g., the TLB 114, is shared by the logical CPUs 112a to 112n, it is determined based on the procedure control module 612 whether a logical CPU that is currently executing the diagnosis program 610 (hereinafter, "current logical CPU") is in charge of making diagnosis of the target device. When it is determined that the current logical CPU (i.e., the logical CPU 112a) is in charge of making diagnosis of the target device, the procedure control module 612 causes the logical CPU 112a to make diagnosis of the target device.

If a plurality of logical CPUs makes diagnosis of a shared device simultaneously, a wrong result of diagnosis may be obtained due to interference between the logical CPUs. To prevent this, if the target device is a device that is shared by a plurality of logical CPUs, the procedure control module 612 controls the logical CPUs so that only one of the logical CPUs makes diagnosis of the target device. The logical CPU that is in charge of diagnosis is called "master CPU".

In the procedure control module 612, the identification number allocated to the logical CPU is used to determine whether the current logical CPU is the master CPU. More particularly, if the current logical CPU is normal and the identification number of the current logical CPU is smallest from among the identification numbers of the logical CPUs sharing the target device, the current logical CPU is determined to be the master CPU. Such determination using the identification number is a simple method requiring no complicated processing such as synchronous processing, and therefore easy to be implemented.

In the above example, because the logical CPU 112a is normal and allocated to the smallest identification number from among the logical CPUs sharing the target device, the procedure control module 612 causes the logical CPU 112a to determine that the current logical CPU (i.e., the logical CPU 112a) is the master CPU, and to make diagnosis of the target device. If the logical CPU 112a is abnormal, the procedure control module 612 executed by another logical CPU that is normal and allocated to the smallest identification number from among the logical CPUs sharing the target device causes the current logical CPU to perform similar determination as described above.

If it is determined that the current logical CPU is not the master CPU, the procedure control module 612 causes the current logical CPU to perform the determination whether the current logical CPU is the master CPU until diagnosis of the target device is completed. With this configuration, if a first logical CPU as the master CPU is abnormal, a second logical CPU replaces the first logical CPU as the master CPU.

In this manner, when the first logical CPU is out of order, the master CPU changes from the first logical CPU to the second logical CPU by a mechanism of software without using a special device (e.g., the system control device disclosed in Japanese Patent Application Laid-open No. H2-311950). Thus, it is possible to provide a reliable and inexpensive information processing apparatus.

If the current logical CPU is not the master CPU, and diagnosis of the target device is completed in a normal state, the procedure control module 612 causes the current logical CPU to execute the target-device selecting module 611 to select the next target device. On the other hand, if the target device is abnormal, the procedure control module 612 causes the current logical CPU to stop the diagnosis process because the current logical CPU cannot work normally.

If a device that is shared by the CPU cores 110a to 110m, e.g., the L2 cache 120, or a device shared by the CPUs 100a to 100k, e.g., the main memory 200, is selected as the target device by executing the target-device selecting module 611, the procedure control module 612 causes the current logical CPU to perform the similar exclusive process.

More particularly, if the target device is shared by a plurality of CPU cores, a logical CPU that is normal and that is allocated to the smallest identification number from among logical CPUs of the normal CPU cores is determined as the master CPU. Moreover, if the target device is shared by a plurality of CPUs, a logical CPU that is normal and that is allocated to the smallest identification number from among logical CPUs of normal CPU cores of the normal CPUs is determined as the master CPU.

The diagnosis executing module 613 is used to make diagnosis of the target device and store a result of the diagnosis in either the CPU diagnosis information 710 or the other-device diagnosis information 720.

If an abnormality occurs in a unit inside the CPU, a result of diagnosis indicative of the logical CPU, the CPU core, or the CPU being abnormal is stored in the CPU diagnosis information 710. For example, if an abnormality occurs in the register 113a, a result of diagnosis indicative of the logical CPU 112a being abnormal is stored in the CPU diagnosis information 710. If an abnormality occurs in the TLB 114, a result of diagnosis indicative of the CPU core 110a being abnormal is stored in the CPU diagnosis information 710. If an abnormality occurs in the L2 cache 120, a result of diagnosis indicative of the CPU 100a being abnormal is stored in the CPU diagnosis information 710.

If it is determined that the units inside the logical CPU, the CPU core, or the CPU are normal, a result of diagnosis indicative of the logical CPU, the CPU core, or the CPU being normal is stored in the CPU diagnosis information 710. For example, if it is determined that the register 113a is normal, a result of diagnosis indicative of the logical CPU 112a being normal is stored in the CPU diagnosis information 710. If it is determined that the TLB 114 and the L1 cache 115 are normal, a result of diagnosis indicative of the CPU core 110a being normal is stored in the CPU diagnosis information 710. If it is determined that the L2 cache 120 is normal, a result of diagnosis indicative of the CPU 100a being normal is stored in the CPU diagnosis information 710.

It is not necessary to determine the entire CPU 100a as abnormal because some of the CPU cores 110a to 110m are abnormal; because, the abnormal CPU cores can be set to a non-operable state by degeneracy processing so that the CPU 100a can function normally as long as the rest of the CPU cores are functioning normally. Similarly, it is not necessary to determine all the logical CPUs 112a to 112n as normal in order for the CPU core 110a to be determined normal; because, the abnormal logical CPUs can be set to a non-operable state by degeneracy processing so that the CPU core 110a can function normally as long as the rest of the logical CPUs are functioning normally.

Figure 4:
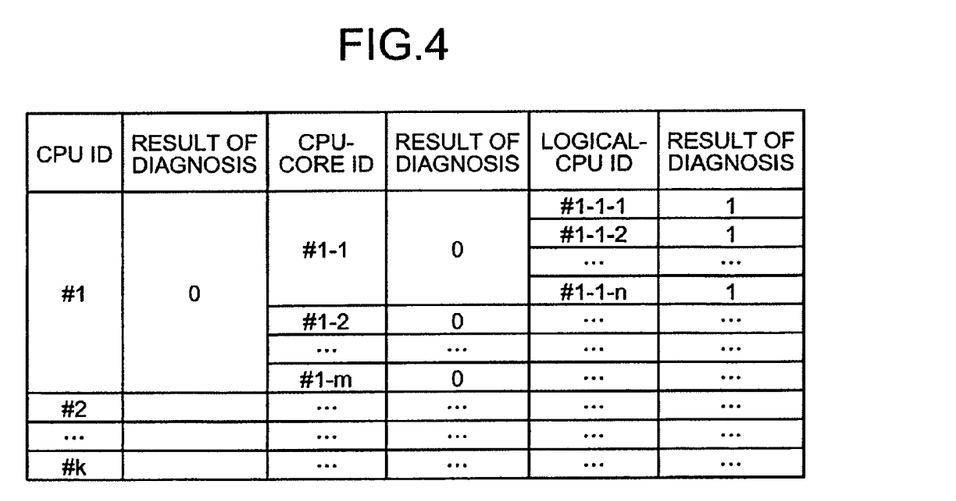
FIG. 4 is an example of data structure of CPU diagnosis information.

FIG. 4 is an example of data structure of the CPU diagnosis information 710. Results of diagnosis are categorized by the CPUs, the CPU cores, and the logical CPUs in the CPU diagnosis information 710. All results of diagnosis are reset to 0 (zero) at starting of the self-diagnosis process. If it is determined from diagnosis that is obtained by executing the diagnosis executing module 613 that the CPU, the CPU core, or the logical CPU is normal, a corresponding value is set to 1. If it is determined that the CPU, the CPU core, or the logical CPU is abnormal, the corresponding value is set to 2.

Figure 5:
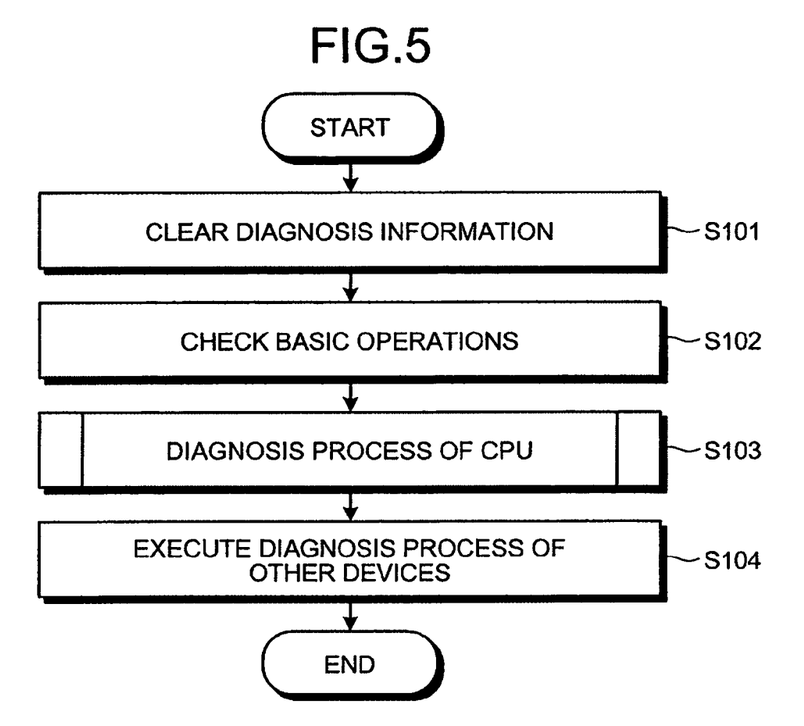
FIG. 5 is a general flowchart of a self-diagnosis process performed by the CPU by using the diagnosis program.

Given below is an explanation about the self-diagnosis process performed by the information processing apparatus 10 during the start-up. FIG. 5 is a general flowchart of the self-diagnosis process.

The information processing apparatus 10 clears the diagnosis information previously stored in the SRAM 700 (Step S101). The service processor 20 checks basic operations of the information processing apparatus 10 (Step S102) to determine whether the CPUs 100a to 100k can perform basic operations required for the self-diagnosis process.

After that, each of the logical CPUs of the CPUs 100a to 100k reads the diagnosis program 610, and executes the diagnosis program 610 to perform a diagnosis process on a corresponding one of the CPUs (Step S103). The logical CPU then executes the diagnosis program 610 to perform a diagnosis process with respect to the other devices (Step S104). Thus, the logical CPU accesses the L1 cache 115 and the L2 cache 120 not directly but via the maim memory 200, and it is necessary to perform diagnosis of the main memory 200 before diagnosis of the L1 cache 115 and the L2 cache 120. Therefore, diagnosis of the main memory 200 is performed at Step S103.

FIGS. 6A to 6D are flowcharts of the self-diagnosis process and the main-memory diagnosis process by executing the diagnosis program 610. Steps in the flowcharts shown in FIGS. 6A to 6D are equivalent to Step S103 shown in FIG. 5. Although each of the logical CPUs executes the diagnosis program 610, an explanation is given below about execution of the diagnosis program 610 by the logical CPU 112a.

Figure 6A:
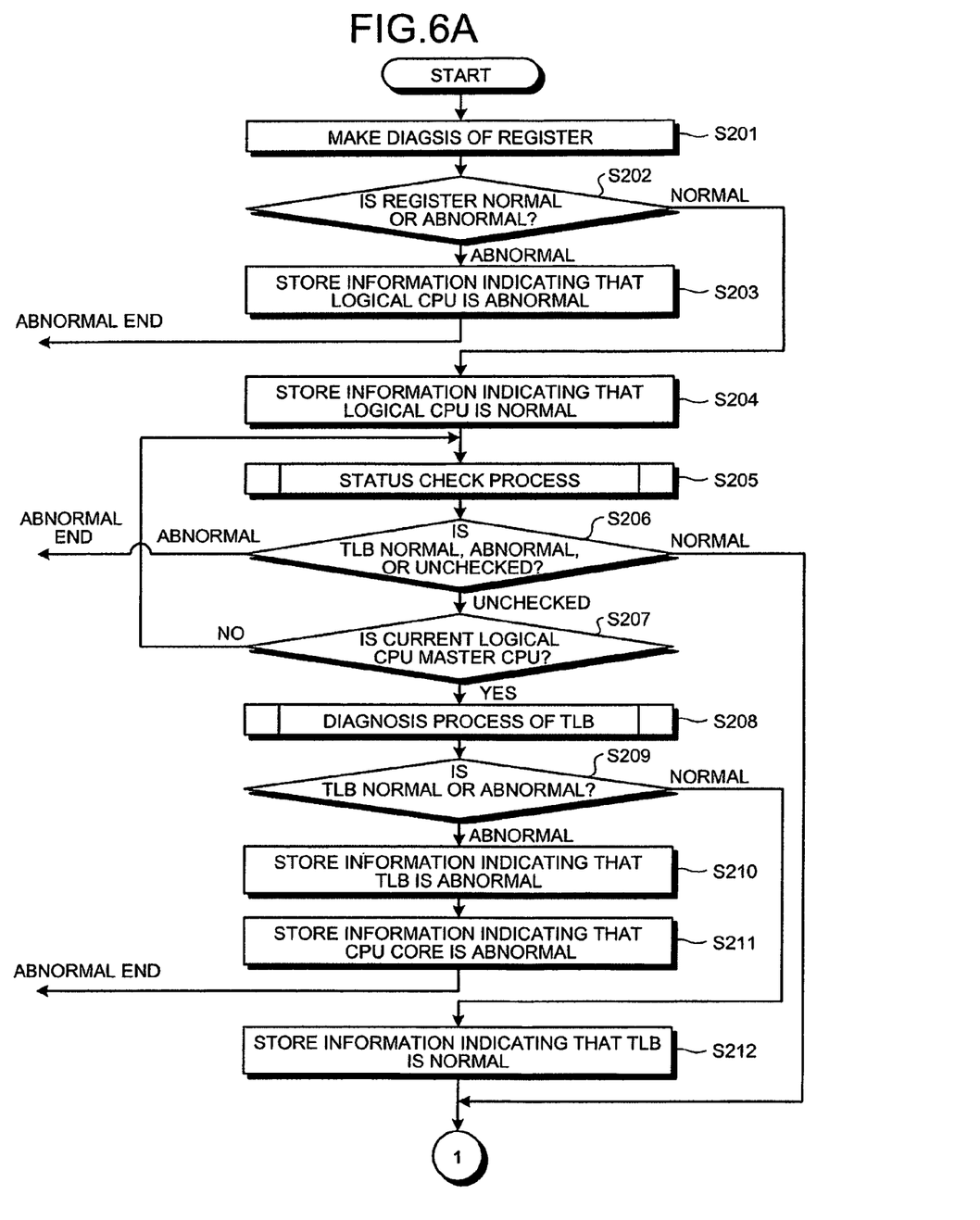
FIG. 6A is a detailed flowchart of the self-diagnosis process.

The target-device selecting module 611 causes the logical CPU 112a to select the register 113a as the target device and causes the logical CPU 112a to make diagnosis of the register 113a (Step S201). Because the register 113a is dedicated to the logical CPU 112a, i.e., it is not shared by any other logical CPU, the logical CPU 112a can start diagnosis of the register 113a without checking if the register 113a is being used by any other logical CPU.

If the register 113a is determined to be abnormal (Abnormal at Step S202), the diagnosis executing module 613 causes the logical CPU 112a to store information indicative of the logical CPU 112a being abnormal in the CPU diagnosis information 710 (Step S203). The self-diagnosis process is terminated in the abnormal state.

On the other hand, if the register 113a is determined to be normal (Normal at Step S202), it means that diagnosis of a unit inside the logical CPU 112a, i.e., the register 113a, terminated in the normal state. Then, the diagnosis executing module 613 causes the logical CPU 112a to store information indicative of the logical CPU 112a being normal in the CPU diagnosis information 710 (Step S204).

Subsequently, the target-device selecting module 611 causes the logical CPU 112a to select the TLB 114 as the target device. The TLB 114 is shared by all the logical CPUs 112a to 112n. Therefore, the procedure control module 612 causes the logical CPU 112a to first check whether the logical CPU 112a is the master CPU by performing a state check process (Step S205).

Figure 7:
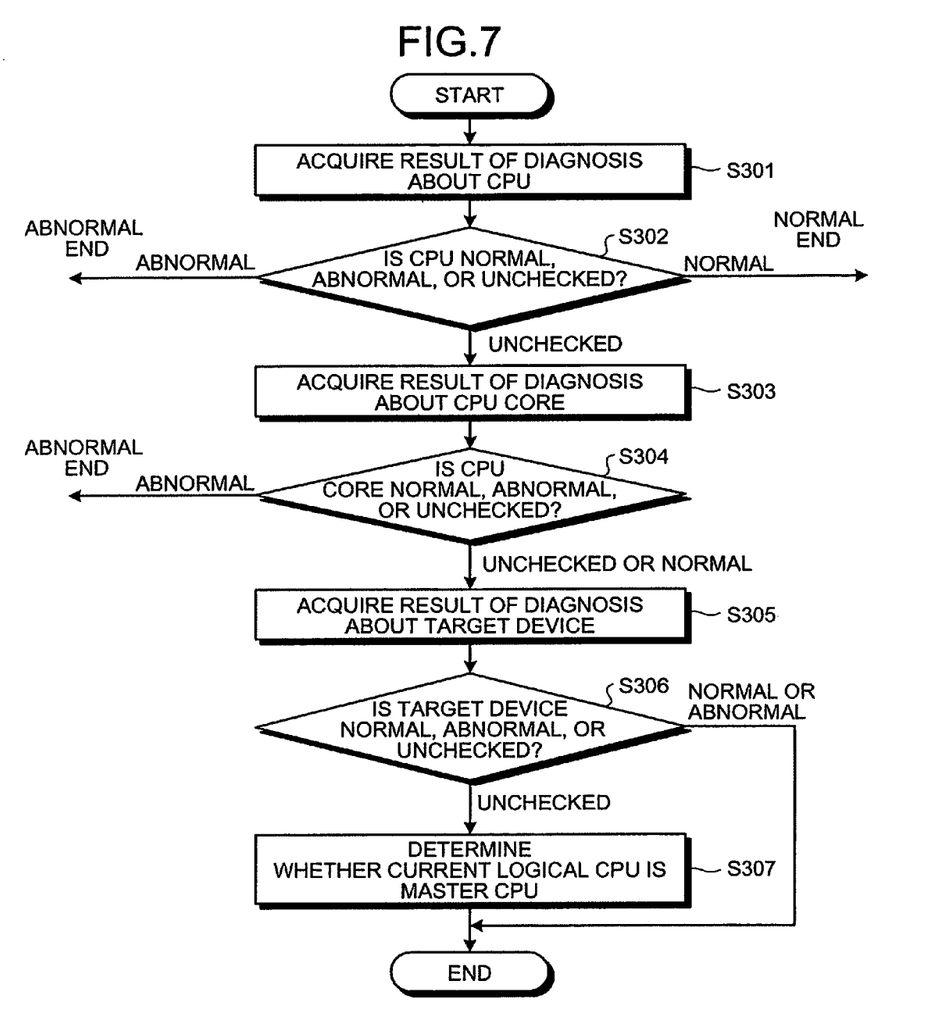
FIG. 7 is a detailed flowchart of a state check process shown in FIGS. 6A to 6D.

FIG. 7 is a detailed flowchart of the state check process. The target-device selecting module 611 causes the logical CPU 112a to acquire a result of diagnosis about the CPU 100a, to which the logical CPU 112a belongs, by referring to the CPU diagnosis information 710 (Step S301).

If the CPU 100a is abnormal (Abnormal at Step S302), the self-diagnosis process is terminated in the abnormal state. If the CPU 100*a* is normal (Normal at Step S302), the self-diagnosis process is terminated in the normal state, because diagnosis of units inside the CPU 100*a* has already been completed.

If the CPU 100*a* is unchecked (Unchecked at Step S302), i.e., it is not known whether the CPU 100*a* is normal or abnormal, the logical CPU 112*a* acquires a result of diagnosis about the CPU core 110*a*, to which the logical CPU 112*a* belongs, by referring to the CPU diagnosis information 710 (Step S303).

If the CPU core 110*a* is abnormal (Abnormal at Step S304), the self-diagnosis process is terminated in the abnormal state. If the CPU core 110*a* is unchecked or normal (Unchecked or Normal at Step S304), the logical CPU 112*a* acquires a result of diagnosis about the target device by referring to the other-device diagnosis information 720 (Step S305).

If the target device is unchecked (Unchecked at Step S306), it is determined whether the logical CPU 112*a* is the master CPU of the target device (Step S307). If the target device is either normal or abnormal (Normal or Abnormal at Step S306), the state check process is terminated.

Referring back to FIG. 6A, if the TLB 114 as the target device is abnormal (Abnormal at Step S206), the self-diagnosis process is terminated in the abnormal state. When the TLB 114 is normal (Normal at Step S206), the process control goes to Step S213 to make diagnosis of the next target device.

When the TLB 114 is unchecked (Unchecked at Step S206) and the logical CPU 112*a* is not the master CPU (No at Step S207), the process control returns to Step S205 to perform the state check process. Steps S205 to S207 are repeated until the logical CPU 112*a* is the master CPU. If the logical CPU 112*a* is the master CPU (Yes at Step S207), the procedure control module 612 causes the logical CPU 112*a* to execute the diagnosis executing module 613 to make diagnosis of the TLB 114 (Step S208).

Figure 8:
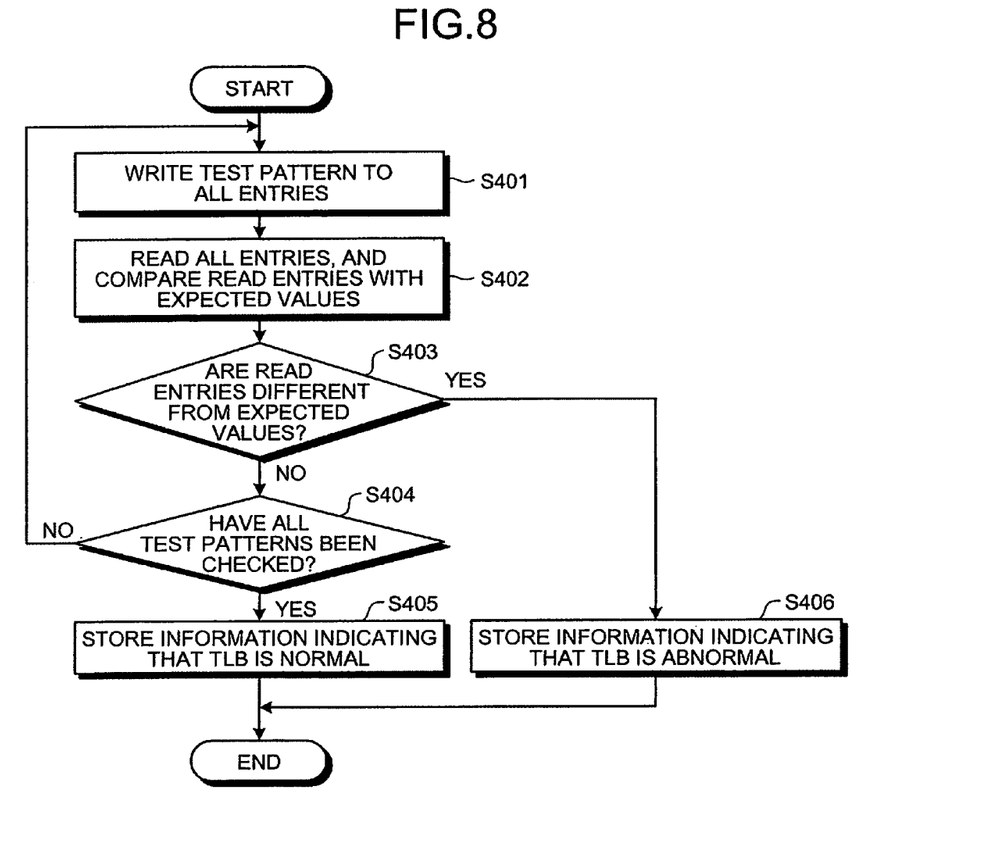
FIG. 8 is a flowchart of a TLB diagnosis process.

As shown in FIG. 8, diagnosis of the TLB 114 is made by, in a situation where a plurality of test patterns is written on the TLB 114 (Step S401), determining whether a value read from the TLB 114 agrees with an expected value (Steps S402 to S404). Moreover, information indicative of whether the TLB 114 is normal or abnormal is stored (Steps S405 and S406).

If the TLB 114 is abnormal (Abnormal at Step S209), the diagnosis executing module 613 causes the logical CPU 112*a* to store information indicative of the TLB 114 being abnormal in the other-device diagnosis information 720 (Step S210) and information indicative of the CPU core 11*a* being abnormal in the CPU diagnosis information 710 (Step S211). The self-diagnosis process is terminated in the abnormal state.

If the TLB 114 is normal (Normal at Step S209), the diagnosis executing module 613 causes the logical CPU 112*a* to store information indicative of the TLB 114 being normal in the other-device diagnosis information 720 (Step S212).

Figure 6B:
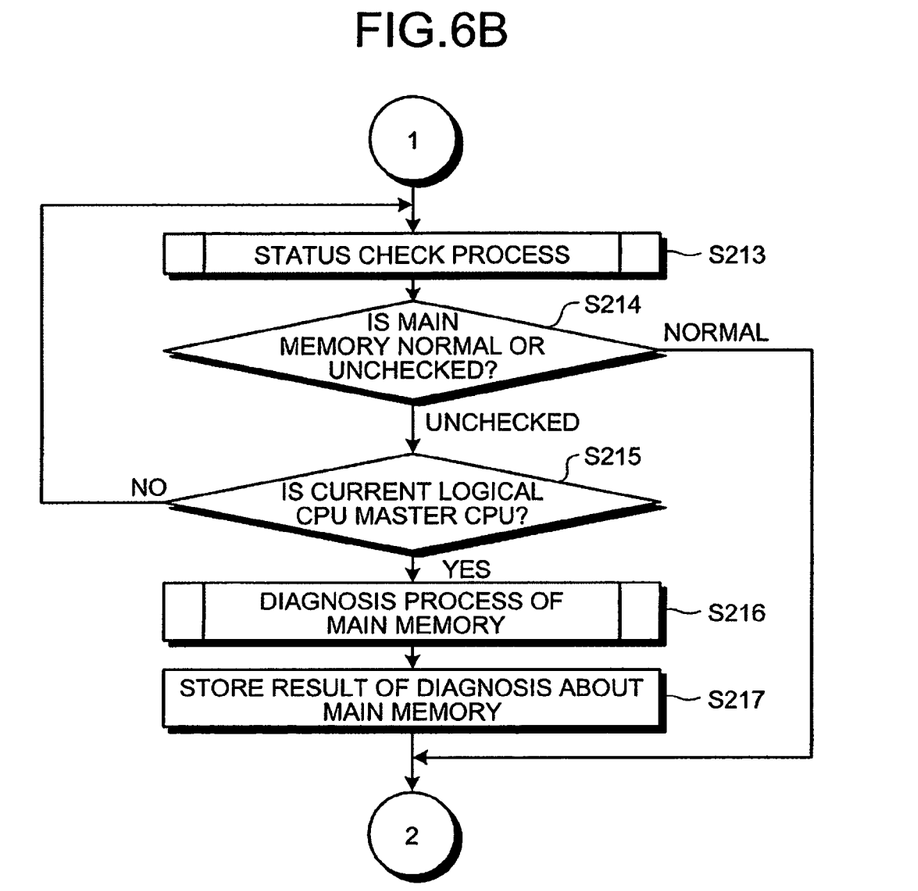
FIG. 6B is a continuation of the flowchart shown in FIG. 6A.

After the diagnosis of the TLB 114 is completed, the target-device selecting module 611 causes the logical CPU 112*a* to select the main memory 200 as the next target device. The main memory 200 is shared by all the CPUs 100*a* to 100*k*. Therefore, the procedure control module 612 causes the logical CPU 112*a* to perform the state check process to check whether the logical CPU 112*a* is the master CPU of the main memory 200 (Step S213).

In the state check process, if the main memory 200 as the target device is normal (Normal at Step S214), the procedure control module 612 causes the process control to go to Step S218 to make diagnosis of the next target device.

When the main memory 200 is unchecked (Unchecked at Step S214) and the logical CPU 112*a* is not the master CPU of the main memory 200 (No at Step S215), the process control returns to Step S213 to perform the state check process. Steps S213 to S215 are repeated until the logical CPU 112*a* is the master CPU.

If the logical CPU 112*a* is the master CPU (Yes at Step S215), the procedure control module 612 causes the logical CPU 112*a* to execute the diagnosis executing module 613 to make diagnosis of the main memory 200 (Step S216). The diagnosis executing module 613 causes the logical CPU 112*a* to store a result of diagnosis about the main memory 200 in the other-device diagnosis information 720 (Step S217).

Figure 9:
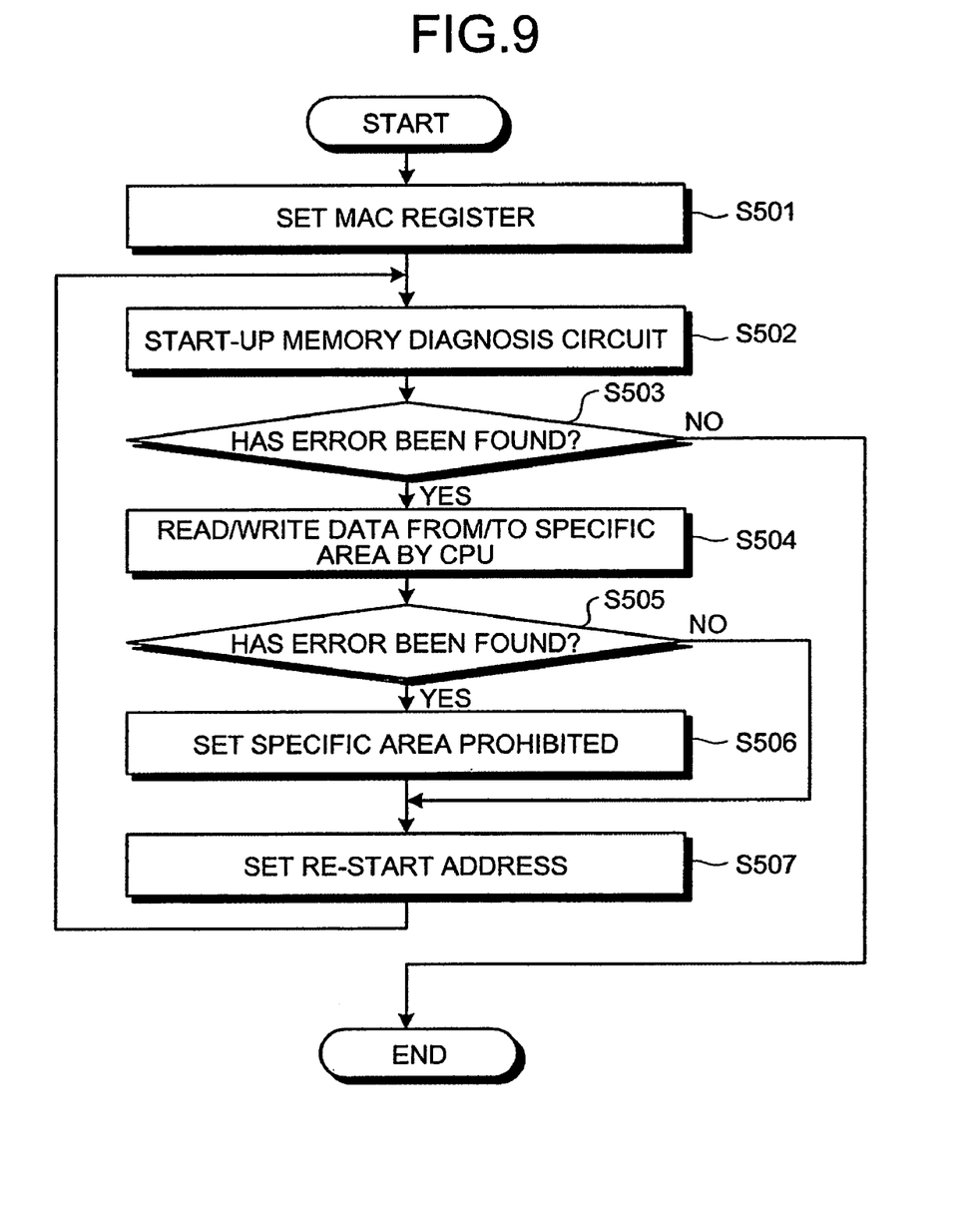
FIG. 9 is a flowchart of a main-memory diagnosis process.

As shown in FIG. 9, diagnosis of the main memory 200 is made by combining diagnosis made by a memory diagnosis circuit and reading/writing diagnosis made by the CPU (Steps S501 to S507).

Figure 6C:
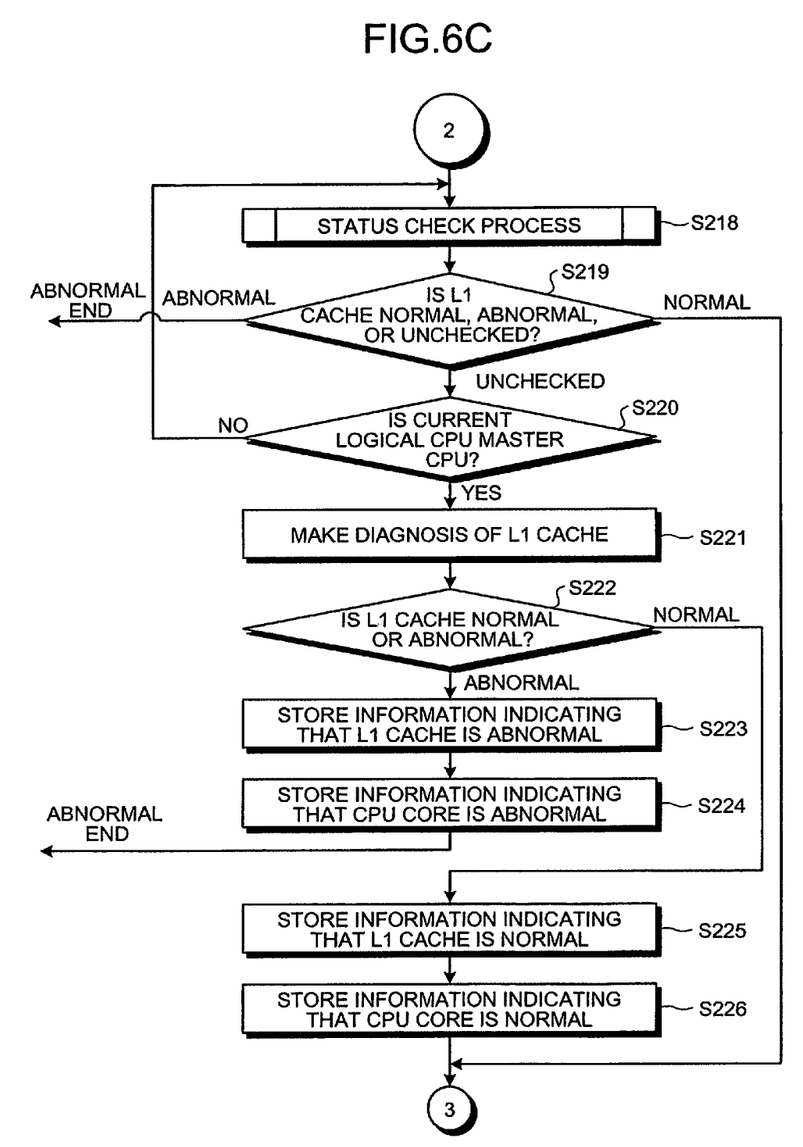
FIG. 6C is a continuation of the flowchart shown in FIG. 6B.

After diagnosis of the main memory 200 is completed, the target-device selecting module 611 causes the logical CPU 112*a* to select the L1 cache 115 as the next target device. The L1 cache 115 is shared by all the logical CPUs 112*a* to 112*n*. Therefore, the procedure control module 612 causes the logical CPU 112*a* to check whether the logical CPU 112*a* is the master CPU of the L1 cache 115 by performing the state check process (Step S218).

In the state check process, if the L1 cache 115 as the target device is abnormal (Abnormal at Step S219), the procedure control module 612 causes the self-diagnosis process to be terminated in the abnormal state. When the L1 cache 115 is normal (Normal at Step S219), the procedure control module 612 causes the process control to go to Step S227 to make diagnosis of the next target device.

When the L1 cache 115 is unchecked (Unchecked at Step S219) and the logical CPU 112*a* is not the master CPU of the L1 cache 115 (No at Step S220), the process control returns to Step S218 to perform the state check process. Steps S218 to S220 are repeated until the logical CPU 112*a* is the master CPU. If the logical CPU 112*a* is the master CPU (Yes at Step S220), the procedure control module 612 causes the logical CPU 112*a* to execute the diagnosis executing module 613 to make diagnosis of the L1 cache 115 (Step S221).

If the L1 cache 115 is abnormal (Abnormal at Step S222), the diagnosis executing module 613 causes the logical CPU 112*a* to store information indicative of the L1 cache 115 being abnormal in the other-device diagnosis information 720 (Step S223) and information indicative of the CPU core 110*a* being abnormal in the CPU diagnosis information 710 (Step S224). The self-diagnosis process is terminated in the abnormal state.

If the L1 cache 115 is normal (Normal at Step S222), the diagnosis executing module 613 causes the logical CPU 112*a* to store information indicative of the L1 cache 115 being normal in the other-device diagnosis information 720 (Step S225), and information indicative of the CPU core 110*a* being normal in the CPU diagnosis information 710 (Step S226) because diagnosis of the units inside the CPU core 110*a* is completed in the normal state. The process control goes to Step S227 to make diagnosis of the next target device.

Figure 6D:
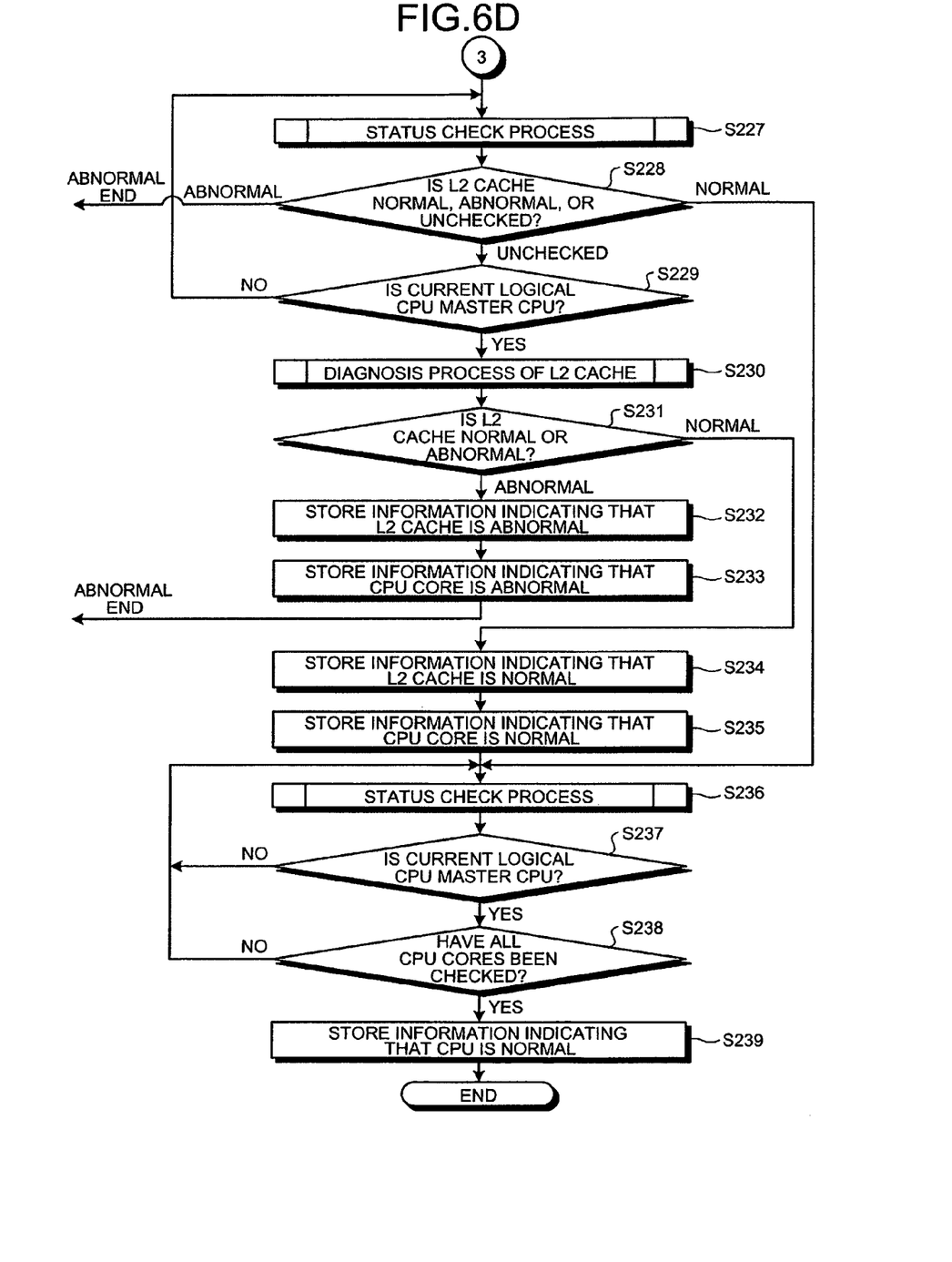
FIG. 6D is a continuation of the flowchart shown in FIG. 6C.

After the diagnosis of the L1 cache 115 is completed, the target-device selecting module 611 causes the logical CPU 112*a* to select the L2 cache 120 as the next target device. The L2 cache 120 is shared by all the CPU cores 110*a* to 110*m*. Therefore, the procedure control module 612 causes the logical CPU 112*a* to perform the state check process to check whether the logical CPU 112*a* is the master CPU of the L2 cache 120 by performing the state check process (Step S227).

In the state check process, if the L2 cache 120 as the target device is abnormal (Abnormal at Step S228), the procedure control module 612 causes the self-diagnosis process to be terminated in the abnormal state. When the L2 cache 120 is normal (Normal at Step S228), the procedure control module 612 causes the process control to go to Step S236 to make diagnosis of the next target device.

When the L2 cache 120 is unchecked (Unchecked at Step S228) and the logical CPU 112*a* is not the master CPU of the L2 cache 120 (No at Step S229), the process control returns to Step S227 to perform the state check process. If the logical CPU 112*a* is the master CPU (Yes at Step S229), the procedure control module 612 causes the logical CPU 112*a* to execute the diagnosis executing module 613 to make diagnosis of the L2 cache 120 (Step S230).

Figure 10:
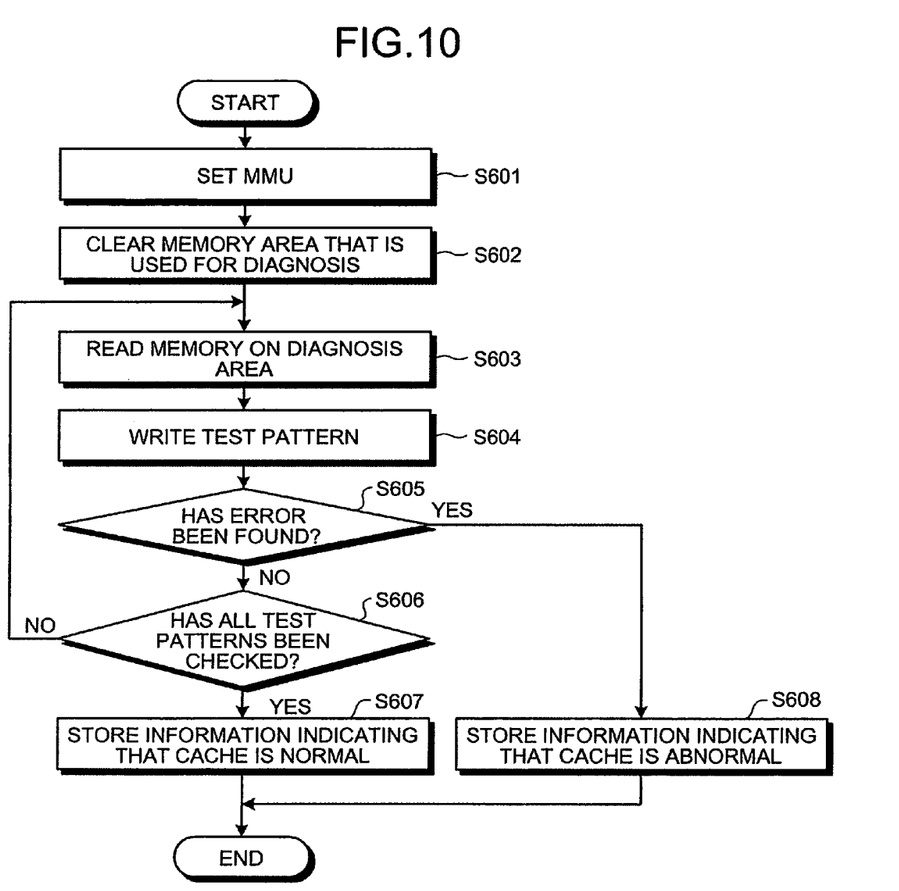
FIG. 10 is a flowchart of an L1/L2-cache diagnosis process.

As shown in FIG. 10, diagnosis of the L1 cache 115 and the L2 cache 120 is made by checking whether data is stored properly in the cache via the main memory 200.

If the L2 cache 120 is abnormal (Abnormal at Step S231), the diagnosis executing module 613 causes the logical CPU 112*a* to store information indicative of the L2 cache 120 being abnormal in the other-device diagnosis information 720 (Step S232), and information indicative of the CPU 100*a* being abnormal in the CPU diagnosis information 710 (Step S233). The self-diagnosis process is terminated in the abnormal state.

If the L2 cache 120 is normal (Normal at Step S231), the diagnosis executing module 613 causes the logical CPU 112*a* to store information indicative of the L2 cache 120 being normal in the other-device diagnosis information 720 (Step S234), and information indicative of the CPU core 110*a* being normal in the CPU diagnosis information 710 (Step S235) because diagnosis of the units inside the CPU core 110*a* is completed in the normal state.

When the logical CPU 112*a* has made all diagnosis of which the logical CPU 112*a* is in charge, the procedure control module 612 causes the logical CPU 112*a* to wait for completion of diagnosis made by other CPU cores. More particularly, the logical CPU 112*a* checks both whether diagnosis of the CPU 100*a* has already been completed and whether the logical CPU 112*a* is the master CPU of the CPU 100*a* by performing the state check process (Step S236).

If the diagnosis of the CPU 100*a* has been complete, the process control goes to end. When the diagnosis of the CPU 100*a* has not been completed and the logical CPU 112*a* is the master CPU (Yes at Step S237), the logical CPU 112*a* checks by referring to the CPU diagnosis information 710 whether diagnosis made by the CPU cores 110*a* to 110*m* has been completed. If diagnosis made by the CPU cores 110*a* to 110*m* has been completed (Yes at Step 238), the logical CPU 112*a* stores information indicative of the CPU 100*a* being normal in the CPU diagnosis information 710. The process control goes to end (Step S239).

If the logical CPU 112*a* is not the master CPU (No at Step S237), or if diagnosis made by the CPU cores 110*a* to 110*m* has not been completed (No at Step 238), the process control returns to Step S236 to perform the state check process.

According to an aspect of the present invention, it is possible to provide an information processing apparatus capable of making diagnosis of a common resource by performing an exclusive process in a proper manner. Moreover, it is possible to perform diagnosis of components reliably.

Furthermore, if there is an abnormal common source, a CPU core or a CPU that shares the abnormal common source is cut off. This leads to increased stability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
    a first storage unit that stores therein a diagnosis program that is used to make a diagnosis whether units forming the information processing apparatus are normal;
    a central processing unit that includes
        a plurality of command control units, each of which executes the diagnosis program independently; and
        a common resource that is shared by the command control units; and
    a second storage unit that stores therein a result of diagnosis that is obtained by the command control units, wherein
    the central processing unit causes only one specific command control unit from among the command control units to execute the diagnosis program to make the diagnosis of the common resource at a given time point,
    the central processing unit monitors the second storage unit until the result of diagnosis is stored in the second storage unit, whereupon it is determined that another command control unit other than the specific command control unit is exclusively in charge of making diagnosis of the common resource that is shared by a plurality of command control units, and
    the central processing unit selects a next target device from among the units forming the information processing apparatus when the result of the diagnosis is stored in the second storage unit.

2. The information processing apparatus according to claim 1, wherein, when an abnormality occurs in a first command control unit that is in charge of making diagnosis of the common resource, the central processing unit causes a second command control unit to make diagnosis of the command resource.

3. The information processing apparatus according to claim 1, wherein
    the information processing apparatus is configured to be connected to a service processor, and
    the service processor makes diagnosis of the command control units before the command control units execute the diagnosis program to make diagnosis of the units forming the information processing apparatus.

4. A computer-readable, non-transitory medium storing a diagnosis program that causes an information processing apparatus to make a diagnosis as to whether units forming the information processing apparatus are normal, wherein the information processing apparatus includes a plurality of central processing unit cores functioning as logical central processing units each of which executes the diagnosis program independently, the diagnosis program causing a specific logical central processing unit from among the logical central processing units to execute:
    selecting a target device, from among the units forming the information processing apparatus, based on a predetermined order;
    determining, when the target device is a device that is shared by another logical central processing unit, whether the specific logical central processing unit is exclusively in charge of making a diagnosis of the target device;
    making the diagnosis of the target device and storing a result of the diagnosis in a storage unit when the target device is a device that is not shared by any other logical central processing unit or when it is determined at the determining that the specific logical central processing unit is exclusively in charge of making the diagnosis of the target device monitoring, when it is determined at the determining that another logical central processing unit other than the specific logical central processing is exclusively in charge of making the diagnosis of the target device that is shared by a plurality of logical central processing units, the storage unit until the result of the diagnosis is stored in the storage unit at the storing; and selecting, when the result of the diagnosis is stored in the storage unit at the storing, a next target device from among the units forming the information processing apparatus.

5. The computer-readable, non-transitory medium according to claim 4, wherein, when it is determined at the determining that another logical central processing unit other than the specific logical central processing unit is exclusively in charge of making the diagnosis of the target device that is shared by a plurality of logical central processing units, the determining is repeated until the result of the diagnosis is stored in the storage unit at the storing.

6. The computer-readable, non-transitory medium according to claim 4, wherein when an abnormality occurs at the making in a target device that is inside a central processing unit core and shared by a plurality of logical central processing units of the central processing unit core, the storing includes storing information indicative of the central processing unit core being abnormal in the storage unit, and the diagnosis program further causing the specific logical central processing unit to execute, when the information indicative of the central processing unit core that includes the specific logical central processing unit being abnormal is stored in the storage unit at the storing, stopping a diagnosis process for the central processing unit core.

7. The computer-readable, non-transitory medium according to claim 4, wherein when an abnormality occurs at the making in a target device that is inside a central processing unit and shared by a plurality of central processing units of the central processing unit core, the storing includes storing information indicative of the central processing unit being abnormal in the storage unit, and the diagnosis program further causing the specific logical central processing unit to execute, when the information indicative of the central processing unit that includes the specific logical central processing unit being abnormal is stored in the storage unit at the storing, stopping a diagnosis process for the central processing unit.

8. A diagnosis method used in an information processing apparatus to make a diagnosis as to whether units forming the information processing apparatus are normal, wherein the information processing apparatus includes a plurality of central processing unit cores functioning as logical central processing units each of which executes the diagnosis program independently, the diagnosis method comprising:

first selecting including selecting a target device from among the devices forming the information processing apparatus based on a predetermined order;

second selecting including selecting, when the target device is a device that is shared by a plurality of logical central processing units, a first logical central processing unit from among the logical central processing units; and first causing including causing the first logical central processing unit to make the diagnosis of the target device, wherein the second selecting includes monitoring, when it is determined at the determining that another logical central processing unit other than the first logical central processing unit is exclusively in charge of making the diagnosis of the target device that is shared by a plurality of logical central processing units, the storage unit until the result of the diagnosis is stored in a storage unit, and the second selecting includes selecting, when the result of the diagnosis is stored in the storage unit, a next target device from among the units forming the information processing apparatus.

9. The diagnosis method according to claim 8, further comprising:

third selecting including, when an abnormality occurs in the first logical central processing unit selected at the second selecting, selecting a second logical central processing unit from among the logical central processing units; and second causing including causing the second logical central processing unit to make diagnosis of the target device.

* * * * *